United States Patent Office  3,506,637
Patented Apr. 14, 1970

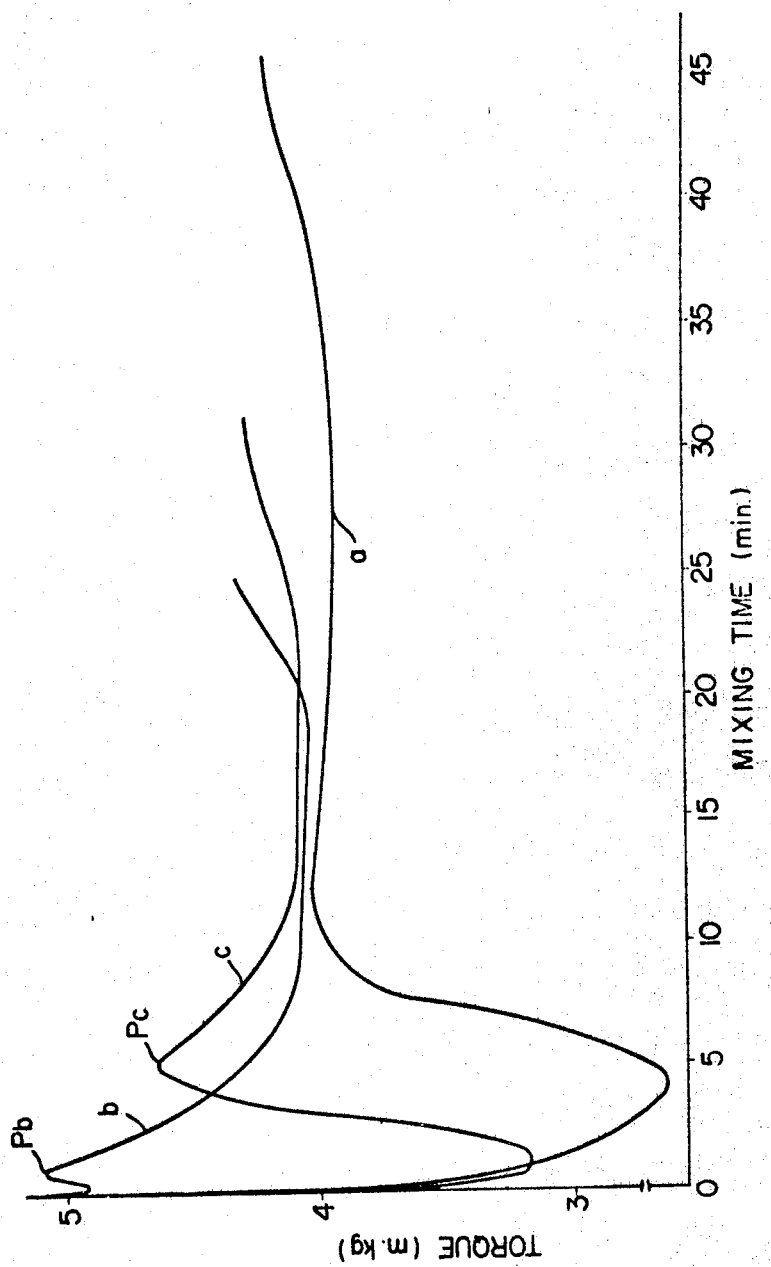

3,506,637
PROCESS FOR THE PREPARATION OF CHLORINATED POLYVINYL CHLORIDE
Tetuya Makino, Namerikawa-shi, Susumu Taima, Uozu-shi, and Saiji Nozaki, Unazuki-machi, Japan, assignors to Nippon Carbide Kogyo Kabushiki Kaisha, Tokyo, Japan, a corporation of Japan
Filed Apr. 11, 1967, Ser. No. 630,066
Claims priority, application Japan, Mar. 14, 1967, 42/15,549
Int. Cl. C08f 27/02
U.S. Cl. 260—92.8                             5 Claims

ABSTRACT OF THE DISCLOSURE

This invention relates to a process for the preparation of chlorinated polyvinyl chloride having an improved rate of chlorination reaction and also in which the degradation and thermal stability characteristics such as resistance to decomposition, to coloration at high temperature, and in processing and working characteristics are improved characterized that the polyvinyl chloride particles having specific shape and size made by a specific method is chlorinated under specific oxygen conditions in an aqueous suspension of the polyvinyl chloride particles.

---

FIG. 1 shows gelation curves of chlorinated polyvinyl chloride resins measured by means of Brabender plastograph, in which the curve $a$ being of the product of this invention, the curve $b$ being of a conventional chlorinated polyvinyl chloride from emulsion polymerization process, and the curve $c$ being of a conventional chlorinated polyvinyl chloride from suspension polymerization process.

This invention relates to a process for the preparation of chlorinated polyvinyl chloride (hereinafter may be referred to as Cl-PVC) with an improved rate of chlorination reaction and also in which the degradation in thermal stability characteristics such as resistance to decomposition and that to coloration at high temperatures and in processing or working characteristics such as flow properties, of the resultant Cl-PVC, which heretofore unavoidably occurred with attempts to increase the chlorine content for realizing more acceptable softening temperature, is conspicuously prevented.

Polyvinyl chloride (hereinafter may be referred to as PVC) is subject to considerably many limitations in the field of its application due to its relatively low softening temperature. As a method to overcome the limitations and improve the low softening point of PVC, chlorination of polyvinyl chloride to form chlorinated polyvinyl chloride is known. As the means for achieving such, that of bubbling chlorine gas into an organic solvent solution or suspension of PVC, of contacting chlorine gas directly with solid PVC powder, or bubbling chlorine gas into aqueous suspension of PVC, are known.

This invention relates to the preparation of Cl-PVC by chlorination of the said aqueous suspension system.

And, the most important technical problems in this particular type of Cl-PVC preparation are the relatively low reaction rate and the difficulty in uniformly performing the reaction.

Concerning the improvement in aqueous suspension-type chlorination with respect to the reaction rate, such proposals were made to perform the reaction under actinic light radiation, in the presence of oxygen, or at high chlorine gas pressure conditions.

Again for improving the non-uniform occurrence of the reaction, use of swelling agent or adoption of other varied conditions in combination with the above described means have been proposed.

Those proposals each having its advantages and disadvantages, that of employing actinic light radiation for increased reaction rates is industrially disadvantageous particularly for aqueous suspension process because of the difficulty for achieving homogeneous radiation effect. On the other hand the proposal of chlorinating PVC in the presence of oxygen is of very high interest from industrial standpoints in respect of operational case and equipments required, if the desired acceleration of the reaction is truly achieved by the simple copresence of oxygen.

In the past, various literatures referred to the effect of oxygen present in the reaction system for Cl-PVC formation. For example, U.S. Patent No. 2,996,489 proposed to pre-heat the reaction liquid or blowing hydrogen chloride or $N_2$ gas into the reaction liquid to purge the oxygen, in order to avoid the presence of any significant amount of oxygen in the reaction system. Again U.S. Patent No. 3,287,336 states that supplying of molecular oxygen into the reaction system separately from and simultaneously with chlorine gas at a rate of, for example, 0.3–0.4 liter per hour per kilo of PVC (hereinafter may be expressed as liter/hr./kg.-PVC) or less, achieves an increased chlorination reaction rate and prompt production of Cl-PVC.

Both of the above U.S. patents relating to the preparation of chlorinated polyvinyl chloride, the former recommends positive exclusion of certain amount of oxygen from the reaction system while the latter advocates positive and continuous supplying of predetermined amount of oxygen. Thus clearly the two take entirely different stands.

We also engaged in extensive researches as to the effect of oxygen on the Cl-PVC formation reaction to find that in some cases the process of U.S. Patent No. 2,996,489 fails to achieve satisfactory results and neither the process of U.S. Patent No. 3,287,336 is always satisfactory. To wit, we found that neither of the above two U.S. patents disclose technical informations necessary for the preparation of good Cl-PVC.

The significance of Cl-PVC in the art resides in its considerably higher softening point than that of PVC. Needless to say, PVC is one of the most common resins widely used because it is inexpensive and has excellent properties, but its low softening point has caused significant limitations on its utility. Accordingly, Cl-PVC having properties of the same level as of PVC and furthermore a softening point considerably higher than the latter can greatly expand the utility of PVC.

However, conventional Cl-PVC's admittedly having softening points higher than that of PVC, they are inavoidably exposed to higher processing temperatures than those employed with PVC and at such high temperatures they are often decomposed, colored, or their properties such as impact strength, impaired. In the specification, resistance to decomposition and coloration of PVC at such high temperatures will be hereinafter collectively referred to as heat stabilities.

Thus it is self-evident that a satisfactory process for Cl-PVC preparation should achieve not only Cl-PVC formation with simple operation and high reaction rate but also the production of Cl-PVC of high softening point and good heat stabilities as described in the above.

According to our researches, it is found, for the preparation of Cl-PVC having such good heat stabilities and excellent working properties, in chlorination of PVC.

(1) that the amount of the molecular oxygen normally concurrently present in the chlorine gas to be supplied critically affects the reaction and the properties of Cl-PVC to be obtained, (2) that for securing satisfactory reaction rate and Cl-PVC of excellent properties, the amount of the said oxygen present in the chlorine gas must be controlled so that the oxygen amount to be supplied within a unit time per unit weight of PVC should be within a predetermined range, and (3) that the volume ratio of the chlorine gas and the oxygen gas to be supplied into the reaction system is a particularly important factor for determining the heat stabilities and working characteristics of Cl-PVC to be formed.

The reason for failure of aforesaid U.S. Patents Nos. 2,996,489 and 3,287,336 to produce Cl-PVC of satisfactory properties is probably due to their complete indifference to the above observations (1), (2) and (3).

(1) Amount of oxygen concurrently present in the chlorine gas

The most common supply source of chlorine gas is that obtained by electrolysis of sodium chloride, and which normally contains at least 0.2 vol. percent to maximum 5 vol. percent of molecular oxygen.

Again the liquid chlorine obtained by liquefying such chlorine gas also contains about 0.05–0.006 vol. percent of molecular oxygen dissolved therein. Accordingly in case liquid chlorine is employed for chlorination of PVC, its oxygen content varies at the early stage and late stage of its use, the oxygen content being relatively high at the early period.

According to our studies, the variation in the oxygen content of such industrial chlorine significantly affects the preparation procedure of Cl-PVC and the properties of the product. It is found that in certain cases because the oxygen contained in the industrial chlorine alone is still too much for the preparation of Cl-PVC of good heat stabilities and processabilities it must be pulled out and in some case it is too little, therefore it is necessary that a predetermined amount of oxygen must be added separately.

(2) Rate of oxygen supply

Thus in accordance with the invention the oxygen content of the material chlorine or oxygen to be separately supplied must be regulated so as to make the total amount of oxygen to be supplied to the aqueous suspension of PVC, including the oxygen contained in the material chlorine, 0.01–0.05 liter/hr./kg.-PVC.

(3) Volume ratio of chlorine gas and oxygen gas to be supplied to the reaction system Again as aforesaid the volume ratio of chlorine gas and oxygen gas to be supplied to the chlorination reaction system of PVC is closely related to heat stabilities, working characteristics and other properties of the Cl-PVC obtained. According to the invention, the oxygen gas concentration on the basis of total volume of chlorine and oxygen gases should be regulated to become 0.05–0.35 vol. percent, preferably 0.1–0.2 vol. percent. In that case, while the gases may be separately supplied to the reaction system, it is preferred to mix the two in advance and supply that gaseous mixture to the system.

In the invention, the regulation of oxygen amount to be supplied to the reaction system to 0.1–0.05 liter/hr./kg.-PVC alone does not always achieve the formation of Cl-PVC of good properties, but together with the said regulation the volume ratio of chorine gas and oxygen gas must be controlled to make the oxygen gas concentration 0.05–0.35 vol. percent, preferably 0.1–0.2 vol. percent. This is very important for the formation of Cl-PVC having good heat stabilities and properties.

Furthermore we came to know that the material PVC should also be selected. To wit, PVC's from ordinary emulsion or suspension polymerization processes are inappropriate, but PVC powder composed of agglomerates of spherical primary particles of 0.1–5 microns in diameter, at least 70 wt. percent thereof having diameters no less than 40 microns, and which is obtained by polymerization of vinyl chloride in the absence of emulsifiers, in an aqueous medium which does not substantially dissolve vinyl chloride monomer nor appreciably swells or deforms the polymer formed, such as water alone or water/methanol mixed medium, and in the presence of an emulsion polymerization catalyst, viz., a polymerization catalyst insoluble in the monomer but soluble in the aqueous medium, should be used.

Furthermore in the chlorination presence of swelling agent in the system as conventionally done for homogeneous chlorination should be avoided. Although the precise mechanism is yet unknown, presence of a swelling agent in the chlorination in accordance with the invention tends to retard the reaction in the midway. An attempt to promote the reaction against that tendency by increased supply of oxygen met a complete failure, as such served only to impair reproducibility of the reaction.

Accordingly, the object of the invention is to overcome the serious deficiency inherent in PVC chlorination by means of aqueous suspension system in the presence of oxygen and to provide a process whereby conspicuous improvements in heat stabilities and flow properties of the product and increased reaction rate can be simultaneously achieved and still in addition whereby Cl-PVC excellently adapted for shaping procedures is prepared so that the shaped products therefrom may also be imparted with improved properties, inter alia, high impact strength.

Many other objects and advantages of the invention will become clear from reading the following disclosures.

Such objects of the invention are accomplished by simultaneously meeting the requirements for the material PVC and those for the manner of chlorination as described in (I) and (II) below, the latter being particularly important.

To wit, the subject process is characterized by the use of (I) PVC powder obtained from polymerization process performed in the absence of emulsifiers but in an aqueous medium which does not substantially dissolve vinyl chloride monomer nor appreciably swells or deforms the polymer formed, in the presence of a polymerization catalyst which is insoluble in the monomer but is soluble in the medium (hereinafter such catalyst may be referred to as emulsion polymerization catalyst), said PVC powder being composed of agglomerates of spherical primary particles of 0.1–5 microns in diameter and at least 70% by weight thereof having diameters no less than 40 microns, which comprises the steps of (II) suspending the said PVC powder in water or hydrochloric acid, feeding chlorine and oxygen into the suspension under such conditions that the rate of oxygen supply is less than 0.05 liter/hr./kg.-PVC but not less than 0.01 liter/hr./kg.-PVC and that the oxygen concentration in the chlorine gas is 0.05–0.35% by volume, and whereby contacting the chlorine with the PVC powder in the suspension at temperatures ranging 55°–80° C. in the absence of swelling agents.

The Cl-PVC obtained in accordance with the invention has very excellent properties, normally having heat stabilities in the order of, the blackening time for the PVC powder of 60 minutes or longer, that for sample piece of moulded sheet of 150 minutes or longer, and Congo red test result of the same sample piece of 25 minutes or longer; flow properties in the order of, flow temperature no higher than 165° C. and flow rate of $20 \times 10^{-3}$ cm.$^3$/sec. or higher; and impact strength of over 6 kg. cm./cm.$^2$ (cf. later appearing Table 1), the given data being obtained with the compositions and by the measurements described later, preceding the working examples.

Another characteristic of the Cl-PVC of the invention is that the same possesses no p-point in accordance with plastograph measurement, as described later in detail.

Hereinafter the subject process will be explained in further details. For an easier understanding, first the data obtained in some of the latter appearing examples and controls are listed in Table 1 below.

In the same table, Examples 1-A, 1-B, 1-C and Controls 1-A, 1-B, 1-C, 1-D, 1-E and 1-F were performed with same starting material meeting the requirements (I) for the starting PVC of the invention in exactly the same manner except the oxygen regulations consisting of rate of oxygen supply and oxygen concentration in the requirements (II) were varied each time. Controls 2 and 3 were performed under the same oxygen regulations employed in Example 1-A, but in Control 2 material PVC was that prepared by conventional emulsion polymerization and in Control 3 it was prepared by conventional suspension polymerization process, thus both cases failing to meet the requirements (I) of the invention. Also for reference corresponding properties of the typical products of non-chlorinated rigid PVC are given.

seen Cl-PVC is not yet completely clear as too many points are still left for clarification by further studies. However the surprising improvement in the workability and the excellent properties of the resultant products cannot be attained outside the scope of the subject process consisting of the requirements (I) and (II) in combination. This can be well understood upon seeing the Table 1 and later appearing many examples and controls.

According to our experiments, the Cl-PVC obtained by our process concurrently possesses the heat stabilities and flow properties as given in Table 2 below. And, as is apparent from Table 1, the products prepared by processes departing from the scope of our invention are unsatisfactory as to most of the said properties.

TABLE 1

| | Reference (PVC) | Example | | | Control | | | | | | | |
|---|---|---|---|---|---|---|---|---|---|---|---|---|
| | | 1-A | 1-B | 1-C | 1-A | 1-B | 1-C | 1-D | 1-E | 1-F | 2 | 3 |
| Oxygen regulations in chlorination reaction: | | | | | | | | | | | | |
| (a) Rate of oxygen supply (l./hr./kg.-PVC) | | 0.036 | 0.023 | 0.038 | 0.156 | 0.030 | 0.050 | 0.372 | 0.351 | 0.007 | 0.036 | 0.036 |
| (b) Oxygen concentration in chlorine gas (vol. percent) | | 0.190 | 0.140 | 0.230 | 0.20 | 0.030 | 0.370 | 1.100 | 0.300 | 0.180 | 0.190 | 0.190 |
| Chlorine content of Cl-PVC (wt. percent) | [1] 56.8 | 67.1 | 67.1 | 66.9 | 67.0 | 67.2 | 67.1 | 67.0 | 67.1 | 66.9 | 67.0 | 67.2 |
| Chlorination time required (before the chlorine content reached about 67%) (hr.) | | 12 | 18 | 8 | 8 | 100 | 7 | 5 | 6 | 80 | 52 | 29 |
| Presence of P point in plastograph measurement | Yes | No | No | No | Yes | [2] | Yes | Yes | Yes | Yes | Yes | Yes |
| Heat stabilities: | | | | | | | | | | | | |
| Blackening time for Cl-PVC (min.) | 60 | 85 | 95 | 73 | 50 | 55 | 46 | 30 | 40 | 51 | 20 | 40 |
| Blackening time for moulded sample sheet (min.) | 180 | 215 | 220 | 195 | 150 | 160 | 130 | 80 | 110 | 155 | 60 | 120 |
| Congo red test result of moulded sample sheet (min.) | 25 | 40 | 43 | 30 | 20 | 23 | 20 | 9 | 18 | 21 | 11 | 16 |
| Flow properties: | | | | | | | | | | | | |
| Flow temp. (° C.) | 165 | 148 | 146 | 151 | 169 | 164 | 170 | 186 | 181 | 171 | 178 | 180 |
| Flow rate (×10⁻³ cm.³/sec.) | 27 | 25 | 28 | 23 | 16 | 19 | 17 | 11 | 14 | 18 | 12 | 13 |
| Impact strength (kg.cm./cm.²) | 4.0 | 7.8 | 7.9 | 7.0 | 4.3 | 5.0 | 4.8 | 2.2 | 3.0 | 4.5 | 4.6 | 5.5 |
| Softening temp. (° C.) | 83 | 117 | 118 | 117 | 116 | 110 | 117 | 116 | 115 | 116 | 108 | 115 |

[1] Cl-content of PVC.  [2] No gelation.

It is of course known that Cl-PVC obtained by chlorination of PVC has improved softening point over the material PVC, which also can be understood by comparing the softening temperature of PVC given as the reference in Table 1 with those of the examples and controls.

This means that in practice Cl-PVC must be exposed to severer working conditions than the case of PVC in its moulding or shaping. Furthermore, the improvement in softening point due to the increased chlorine contents invites the necessity of considerably severer working conditions for the Cl-PVC compared with those employed for moulding of PVC, due also to the degradation in flow properties of the Cl-PVC. And, as aforesaid, there being no relationship between the improvement in softening point and the product's heat stabilities and flow properties, conventional Cl-PVC's have high softening points and low heat stabilities and accordingly attempts to avoid the degradation in the product's properties during moulding operations result in insufficient moulding or even make the moulding inoperable. On the other hand, adoption of severer working conditions to overcome such drawbacks causes such objectionable phenomena as degradation in the physical properties of coloration of the products due to thermal decomposition at the time of moulding.

Therefore preparation of Cl-PVC of improved softening temperatures with improved chlorination reaction rate of PVC so that high chlorine contents may be attained within acceptably short time while avoiding degradation of PVC during the reaction still hardly accomplished the true object for heat resistance improvement of PVC by chlorination, unless the products' heat stabilities and flow properties under their working conditions are simultaneously improved.

Whereas in accordance with the present invention Cl-PVC well adapted for moulding which heretofore has not been obtained is provided, simultaneously with improved rate of chlorination reaction. The reason why the requirements (I) or (II) or combination of the two contribute for the provision of such excellent, heretofore un-

TABLE 2

| | |
|---|---|
| Heat stabilities: | |
| Blackening time of Cl-PVC powder (min.) | No less than 60 (preferably no less than 70). |
| Blackening time of moulded sample sheet (min.) | No less than 150 (preferably no less than 180). |
| Congo red test result of mould sample sheet (min.) | No less than 25 (preferably no less than 30). |
| Flow properties: | |
| Flowtemp. (° C.) | No higher than 165 (preferably no higher than 160). |
| Flow rate (×10⁻³ cm.³/sec.) | No less than 20. |

NOTE.—The testings and the sample preparations are done in all cases according to the disclosures made preceding the later appearing examples.

Such Cl-PVC concurrently possessing the heat stabilities and flow properties of the level as indicated in Table 2 has never been provided in the past as demonstrated by the later appearing many examples and controls. Furthermore the Cl-PVC of the invention normally has no P point by the later described plastograph measurement. Again the Cl-contents of the Cl-PVC of the invention normally range 63-69% by weight, which may be raised to around 70% if desired, and such Cl-PVC of high Cl-contents retain the excellent properties as shown in Table 2.

Now the invention will be described in further details with reference to the foregoing Table 1 and later appearing examples and controls.

In the subject process, PVC powder polymerized by the process as specified in the requirements (I) having the specified granular form and diameters is used. Furthermore, the specified manner of polymerization is distinguished from conventional emulsion polymerization process in that the former is performed in the absence of emulsifiers but employing an emulsion polymerization catalyst. It is again distinguished from conventional suspension polymerization by its use of an emulsion polymerization catalyst which is insoluble in vinylchloride monomer but is soluble in aqueous medium. Furthermore it is clearly distinguishable from both solution and mass polymerization process.

As is apparent from comparing the results of Example 1-A with Control 2 using PVC from emulsion process and Control 3 using PVC from suspension process (in both controls the chlorination was performed in exactly the same manner as in Example 1, meeting the requirements (II) of the invention), with starting PVC's polymerized in different manner from that defined in requirements (I), the resultant Cl-PVC's fail to concurrently possess the excellent heat stabilities and flow properties as shown in Table 2.

For instance, while non-chlorinated PVC has a flow temperature around 165° C. as shown in Table 1, the products of Controls 2 and 3 have that more than 10° C. higher compared therewith, and have flow rates less than ½ that of PVC. This notable difference in flow temperatures quite significantly affects the respective working properties, causing still more conspicuous difference. Again the Cl-PVC's of Controls 2 and 3 are hardly satisfactory as to heat stabilities. Furthermore comparing the heat stability values and flow property values of the Cl-PVC's of Examples 1-A-1-C in accordance with the invention with those of the products of Controls 2 and 3, the conspicuous differences in working properties can be understood. Inferior flow properties result in exposure of the resin to repetitive severe heating conditions. Since the Cl-PVC's of Controls 2 and 3 having too poor heat stabilities to endure such, their improved heat resistance by chlorination in fact cannot be utilized. Consequently use of PVC's from conventional emulsion or suspension processes as the starting materials for Cl-PVC never achieves satisfactory results.

In the subject process, such PVC powder having the granular form and diameter as described in requirements (I) may be obtained directly from the polymerization of the manner described in the same requirements, but in most cases the polymerization produces agglomerates of greater sizes, normally having diameters ranging 3–10 mm. In that case the agglomerates should be ground and sieved until the agglomerates having diameters greater than 40 microns occupy at least 70% by weight of the entire PVC powder. With this additional pulverizing step, still the latter procedure is the more advantageous industrially, since such dispenses with special manipulation during the polymerization. Furthermore the powder of which grain sizes are adjusted grinding has more ideal state of agglomeration of the spherical primary particles and therefore is more advantageous for achieving the object of the invention.

The polymerization is performed in an aqueous medium such as water or water/methanol system which does not substantially dissolve vinyl chloride monomer nor appreciably swells and deforms the polymer formed, in the presence of an emulsion polymerization catalyst such as, for example, potassium persulfate, ammonium persulfate, hydrogen peroxide, water-soluble organic hydroperoxides and the like. Such catalyst may also be used in combination with suitable reducing agent as for redox polymerization.

In case of grinding the agglomerates, any grinding means normally employed with solids may be optionally adapted. For example, impeller breaker, ball mill, tube mill or hand mill type grinders may be used.

The polymerization is normally performed at temperatures ranging from 40°–65° C., and the amount of the catalyst to the vinyl chloride monomer is normally in the order of 0.01–0.5% by weight.

In the subject process, such starting PVC as heretofore described is suspended in water or hydrochloric acid, and its chlorination is performed in that aqueous suspension in the oxygen-copresence system.

At that time, the amount of oxygen supply and the oxygen concentration are subject to limitations of very narrow and specific scope and so such oxygen regulations to satisfy both of the limitations are required.

In the conventional oxygen-copresence chlorination system, function of oxygen to improve the reaction rate alone has been highlighted and accordingly the investigation whether the severe condition of chlorination in the presence of oxygen would objectionably affect the material PVC during the chlorination or the Cl-PVC formed, for example, cause their degradation, has been seemingly entirely neglected.

According to our researches, the rate of oxygen supply of 0.3–0.4 liter/hr./kg.-PVC heretofore recommended as preferable and satisfactory minimum amount of oxygen catalyst must be avoided. What is more important, the oxygen concentration in the chlorine gas supply must be controlled, and failure of either one of the supply rate or the concentration to meet the requirements (II) of the invention causes the product's failure to have the desirable heat stabilities and flow properties. Neither improved chlorination reaction rate can be obtained in such cases, and even when Cl-PVC of high chlorine contents were thereby obtained, such would not possess working properties of any practical level and which, if forcibly moulded under necessarily severe conditions, would not substantially exhibit adaptability as moulded product.

The oxygen regulations required in the requirements (II) of the invention are as follows.

(a) Rate of oxygen supply: less than 0.05 liter/hr./kg.-PVC and not less than 0.01 liter/hr./kg.-PVC, preferably 0.02–0.04 liter/hr./kg.-PVC.

(b) Oxygen concentration in chlorine gas (N.T.P.): 0.05–0.35% by volume, preferably 0.1–0.3, inter alia, 0.1–0.2% by volume, the optimum being 0.15±0.03% by volume.

Since normally the industrially available chlorine obtained by electrolysis of NaCl contains oxygen at the concentrations ranging 0.2–0.5, in certain cases even as high as 5.0% by volume, if additional oxygen is supplied into the system at the rate of about 0.3 liter/hr./700 g.-PVC, such far exceeds the upper limit of the oxygen concentration as specified in (b) above, required in the invention.

Again in case of utilizing industrially available liquid chlorine from other sources, since oxygen hardly liquefies under the conditions for liquefying chlorine gas, the non-liquefied oxygen is purged leaving traces of oxygen dissolved in the liquid chlorine, such as, at most less than 0.05% by volume, normally in the order of 0.01–0.006% by volume. That oxygen alone thus fails to reach the lower limit specified in the condition (b) of the invention, but if additional oxygen is supplied in an amount of about 0.3 liter/hr./700 g.-PVC as aforesaid, again the total oxygen concentration exceeds the upper limit. Furthermore particular care is required for controlling the oxygen amount in using liquid chlorine, since the oxygen dissolved therein is largely liberated at the initial stage of chlorination.

Consequently in accordance with the invention, unless the electrolysis for chlorine formation is subjected to certain specific control, industrially available chlorines must be added with, or removed of, oxygen. For example, oxygen may be supplied to liquid chlorine immediately before the latter's introduction into the reaction zone in the controlled amounts to fulfil the oxygen concentration condition (b) within the oxygen supply rate condition (a). Or the liquid chlorine may first be distilled to be substantially completely removed of oxygen and thereafter oxygen may be supplied thereinto in suitably controlled manner. Furthermore, the chlorine from electrolysis may first be liquefied and distilled to be partly removed of the oxygen so as to meet the requirements of the invention, or may be completely removed of the oxygen so that further separate supply of oxygen may be given thereto as in the immediately preceding case.

And, in accordance with the invention the chlorination is performed in the absence of swelling agents as said in the requirements (II). Conventionally presence of a swelling agent has been recommended for uniform chlorination. However in the invention substantial swelling action of the PVC grains is not only unnecessary, but the chlorination must be performed in positive absence of any swelling agent.

Presence of swelling agent tends to retard the chlorination reaction and impairs reproducibility of the reaction. The chlorination in the manner of Example 1 except the presence of a swelling agent produces only quite unsatisfactory results.

Concerning the oxygen supply conditions (a) and (b) of the invention, a further explanation will be given with reference to the foregoing Table 1.

Said Table 1 shows that Examples 1–A through 1–C meeting the oxygen regulations produced Cl–PVC well satisfying the heat stability values and flow property values given in Table 2. Whereas Controls 1–A through 1–E used the starting PVC of the invention but failed to satisfy the oxygen regulations of the requirements (II). More particularly, Control 1–A meets (b) but does not satisfy (a); Control 1–B meets (a) but employed oxygen concentration less than the lower limit given in (b); Control 1–C employed a supply rate corresponding the upper limit of (a) and the concentration, a little higher than the upper limit in (b); Control 1–D employed both conditions exceeding the upper limits of (a) and (b); and, Control 1–E used a supply rate higher than the upper limit of (a) similarly to 1–D, but satisfied (b).

The products of these Controls 1–A through 1–E do not concurrently possess the excellent heat stabilities and flow properties possessed by the products of this invention without exception as shown in Table 2, and furthermore their said properties are much inferior. Their inferiority is still more persuasive when compared with the properties of Cl-PVC's of Examples 1–A through 1–C. Furthermore, in Control 1–F, the oxygen supply rate was made less than 0.01 liter/hr./kg.-PVC and the oxygen concentration was made the optimum value for the invention of 0.18%, but still the chlorination reaction rate was markedly reduced, and the resultant Cl-PVC had much lowered working adaptability.

Incidentally, the oxygen supply rate of Control 1–C is that which is said to be employable for conventional oxygen-copresence chlorination process, and its oxygen concentration corresponds to the value within the normal oxygen contents of chlorine from the electrolysis which is the normal industrial source for chlorine supply, viz., 0.2–0.5 vol. percent. And, the oxygen supply rates employed in Controls 1–D and 1–E are within the range of 0.3–0.4 liter/hr./kg.-PVC which has been heretofore recommended to be the preferred minimum amount of oxygen catalyst.

Again from the results of Table 1 it can be understood that the moulded products from the Cl-PVC of the invention have notably improved impact strength.

Furthermore, in accordance with the invention the chlorination is performed at a temperature within the range of 55°–80° C. At temperatures below 55° C. the chlorination tends to become substantially difficult of progress, while at those exceeding 80° C., the working properties of Cl–PVC formed are markedly impaired and also its mechanical strength is appreciably lowered.

In the invention, it is particularly advantageous to vary the reaction temperatures at the two stages of initial reaction period and thereafter, for achieving better improvements in the working properties of Cl-PVC. Preferably, during the initial period of the reaction the temperature is maintained within the range of 55° C. to below secondary transition point PVC, and when the chlorine content of Cl-PVC reached about 62%, a temperature within the range of 65–80° C. and higher than the initial reaction temperature is employed for further reaction. Temperatures in the vicinity of 70–75° C. are particularly preferred for the latter stage.

In that case, it is more advantageous to promote the earlier stage of the reaction in the presence of oxygen, and the latter stage, in the substantial absence of oxygen, for obtaining better improvemens in heat stabilities and flow properties of the Cl-PVC formed.

For the chlorination the material PVC being added to water or hydrochloric acid to form an aqueous suspension by the means known per se, the preferred slurry concentration is normally in the order of 10–40% by weight of PVC. Of course lower or higher slurry concentrations than the above range may be employed if desired but for industrial operation the above range is the preferred.

Again in the chlorination of the invention elevated pressures should be avoided because such adversely affect the granular form described in the requirements (I), and the photo-radiation is undesirable.

The Cl-PVC obtained in accordance with the subject process normally has no P point by plastograph measurement. This point will require further explanation.

Reports on gelation curves of PVC by Brabender plastograph are found, for example in Fukawa & Daimon: Kogyo Kagaku Zasshi 64, Japan, 2053 (1961) p. 2054, or Aino: Nagoya Research Institute of Industrial Technology Report 15, Japan [6] 159 (1966) p. 162.

And, when the gelation curve by plastograph process is measured as to PVC under specific conditions, regardless whether the polymer is from emulsion process or suspenion process, the torque indicating the resistance received during kneading increases with the time passage until a maximum point is reached, and thereafter the torque decreases for some time, followed normally by a period of certain length during which the value is almost constant.

It is known that such PVC with which the maximum point (referred to as P point in the invention) is reached within a short time has a high rate of gelation and excellent working characteristics. And, normally the sooner the P point appears, the greater the maximum value of the torque.

Accordingly, in the past based on the technical concept that such PVC with which the said maximum point can be reached within short time should be produced, efforts have been made for the production of PVC having such gelation curve.

We studied this P point which has been one of the norms for judging working adaptability of PVC as to Cl-PVC to find that, as also shown in Table 1, according to the subject process Cl-PVC normally having no P point can be obtained. Contrary to the expectation based on the contemporary knowledge on P point as to PVC that Cl-PVC having a P point would have good working adaptability, the result was the complete opposite. This can be also understood upon examining the relevancy between the presence of absence of P point and the products' heat stabilities and flow properties as shown in Table 1.

For assisting the understanding of P point, in FIG. 1 the curve obtained by the plastograph measurement of Cl-PVC of Control 2 from PVC of conventional emulsion polymerization process and that of Cl-PVC of Control 3 from PVC of conventional suspension polymerization process are given respectively as curve $b$ and curve $c$. Whereas the curve similarly obtained with Cl-PVC of a typical embodiment of the invention is also given as curve $a$.

As seen in said FIG. 1, the curve $b$ has $Pb$ as its P point and the curve $c$ clearly shows $Pc$ as its P point. In contrast thereto, the product of the invention shows no substantial presence of such conspicuous P point.

The plastograph measurement is done in the following manner.

Plastograph measurement (1) Measuring machine: Heavy Duty Plastograph manufactured by Brabender Co., Capacity 50 g. Roller-type.

(2) Formulation:

| | Parts by weight |
|---|---|
| Cl-PVC | 100 |
| Tribasic lead sulfate | 3.5 |
| Dibasic lead stearate | 1.0 |
| Polyethylene (molecular weight=1,500–2000) | 1.0 |
| Cadmium/barium complex stabilizer | 1.0 |
| Organic tin stabilizer | 1.0 |
| Ethylene/vinyl acetate copolymer | 5.0 |

(3) Preparation: The above composition was mixed by means of an Ishikawa-type blender at 120° C. for 20 minutes, and thereafter was cooled to provide the test sample.

(4) Operation of Brabender:

Temperature (kneading zone)—180° C.
Sample quantity—63 g.
Number of rotation—30 r./m.

Hereinafter numbers of embodiments of the invention will be explained with reference to examples conferring to controls. The quality tests of the products Cl-PVC's were performed by the below-listed methods.

(I) PREPARATION OF SAMPLES (1) Compounding and milling 1.1 Compounding: Cl-PVC with other additives were mixed by means of an Ishikawa-type blender (product of Ishikawa Kojo Mfg. Co., Ltd. Tokyo, Japan) at 120° C. for 20 minutes.

1.2 Milling: The resultant mixture was kneaded by means of 175° C. mixing roll of 8" for 15 minutes to be made into a sheet of about 0.5 mm. thickness.

(2) Preparation of samples for heat stabilities and flow properties measurement 2.1 Samples for blackening time (heat stabilities) measurement:

(1) Sheet—From the above sheet obtained as in item 1.2, about 5 x 7 cm. piece was cut off to serve as the test sample.
(2) Cl-PVC powder—Cl-PVC completed of chlorination was washed with water and dried, the resultant powder being tested as it was.

2.2 Congo red test (heat stabilities) test samples and flow stabilities test samples: The sheet obtained in item 1.2 was cut to have a side no longer than 1 mm. and used as the sample.

(3) Samples for softening temperature measurement 3.1 Plate: The sheet obtained in item 1.2 was hot pressed for 10 minutes under the moulding temperature and pressure conditions of 190° C. and 35 kg./cm.$^2$ (gauge pressure), and the resultant plate was cut to the standard size of JIS K 6742 (1.5 mm. length, 10 mm. width, 2 mm. thickness) to serve as the test sample.

3.2 Pipe and elbow: The pipe and elbow obtained under the later specified moulding conditions were cut to the standard size of JIS K 6742 to serve as the test samples.

(4) Samples for impact strength measurement 4.1 Plate: The test piece obtained in item 3.1 provided at one side with a V notch of 45° angle and 0.6 mm. depth at the position 5.5 mm. from one end of the piece in the longitudinal direction was employed.

4.2 Pipe and elbow: The pipe and elbow obtained under the later-specified extruding conditions were cut and hot pressed at 180° C. for 5 minutes at 30 kg./cm.$^2$. From the plate a test piece of 15 x 10 x 2 mm. size was cut off and which was given a V notch in the same manner as in item 4.1.

(5) Sample for tensile strength measurement

The pipe obtained under the later specified extrusion conditions was made into the standard size test piece of JIS K 6741.

(6) Samples for flattening test

The pipe obtained under the later specified moulding conditions was cut to the standard size of JIS K 6742–1956.

(7) Preparation of samples for initial coloration Measurement

The test piece obtained by exactly the same manner of moulding as of item 3.1 except that the sample dimensions were made 50 mm. length, 40 mm. width and 2 mm. thickness, was employed as the sample.

(II) MEASURING CONDITIONS AND METHODS (1) Heat stabilities 1.1 Congo red test: Under the operations as specified in JIS K 6723 except that the temperature was made 200±2° C., the time (min.) was measured.

1.2 Blackening time:

(1) Sheet—The sample was heated in a Geer's oven of 190±2° C. and the time passed before its blackening (min.) was measured.
(2) Powder—The same operation as of the blackening time measurement for the sheet excepting the adoption of oven temperature of 200±2° C. was employed.

(2) Flow properties 2.1 Flow temperature: Employing Koka-type Flow Tester (manufactured by Shimazu Seisakusho, Kyoto, Japan), the molten resin was extruded through a nozzle of 1 mm. diameter and 1 mm. length under a pressure of 100 kg. cm.$^2$ with a rate of temperature rise of 3° C./min., and the temperature at which the flow rate of the resin reached $2 \times 10^{-3}$ cm.$^3$/sec. was read.

2.2 Flow rate: Employing Koka-type Flow Tester (manufactured by Shimazu Seisakusho, Kyoto, Japan), the molten resin was extruded through a nozzle of 1 mm. diameter and 10 mm. length under a pressure of 200 kg./cm.$^2$, and the flow rate (cm.$^3$/sec.) at 200° C. was measured.

(3) Softening temperature

Under the operations as specified in JIS K 6742 excepting the initial heating temperature of the metal die of 90° C., the softening temperature (° C.) was read.

(4) Impact strength (1) Measuring machine: Dynstat tester produced by Karl Frank GMBH (Germany)
(2) Measuring conditions:

Length of pendulum—25 cm.
Swing-up angle—60°
Impact energy—5 kg./cm. (small size weight was used)
Impact distance—7 mm.
Measuring temp.—25° C.

(3) Measured values: The numerical value obtained by dividing the energy (kg. cm.) required for destruction of the test piece obtained under the above measuring conditions, by the area corresponding to the remaining thickness of the notched portion was made the measured value (kg. cm./cm.$^2$).

(5) Tensile strength

Operating in exactly the same manner as described in JIS K 6741, the obtained values were expressed by kg./cm.$^2$. The measurement was carried out at 25° C.

(6) Flattening test

Following the instructions of JIS K 6742–1956, the test was performed in the following manner.

The sample was interposed between two flat sheets and pressed in the direction at right angle with the tube axis at the rate of 10 mm./min. The maximum load exerted before the inner walls of the tube came into contact or the tube was broken was measured, and the load was corrected to that at 15° C. in accordance with the equation below.

$$P = Pt/[1+0.015(15-t)]$$

P=load at 15° C. (kg.)
Pt=load at $t$ ° C. (kg.)
t=temperature at the time of measuring (25° C.)

(7) Initial coloration test (1) Measuring machine: Same to that defined in ASTM D 1003–52.

(2) Measuring conditions: Referring to FIG. 1 of ASTM D 1003–52, the reflectivity of the sample, when a blue filter having a maximum transmission at 450 mµ was inserted between Collimeter and Position I and a white magnesium oxide plate smoked immediately preceding the measurement was inserted at Position II, was measured to give the value A.

Then the white magnesium oxide plate at Position II was replaced by the sample piece for the initial coloration measurement and the reflectivity was similarly measured to give the value B. The initial coloration is expressed by percentile values as obtained by the equation below.

$$\text{Initial coloration} = \frac{B}{A} \times 100\%$$

For the synthesis of the Cl-PVC composed of agglomerates of spherical primary particles and having no P point by plastograph measurement as intended by the invention, the suitable starting PVC is industrially prepared in accordance with, for example, the methods described in the following references 1–3.

REFERENCES 1–4

A polymerization vessel was charged with 200 parts of water and 0.04 part of potassium persulfate and after replacing the air in the vessel with nitrogen, 100 parts of vinyl chloride was added thereinto. The content was maintained at 62° C. under suitable agitation and to which further 0.01 part of sodium sulfite was added, followed by 15 hours' polymerization. Whereby pearly polyvinyl chloride composed of agglomerates of spherical primary particles, and of which greater part of the secondary grains have the diameters ranging 3–5 mm. was obtained. Upon suitably grinding the same, PVC powder having a polymerization degree of 800 and the grain size distribution as in Table 3 was obtained.

Furthermore, observation of the PVC grains obtained in the present references with electron microscope revealed that they were agglomerates of spherical primary particles, said particles having a wide diameter distribution ranging 0.1–5µ.

A polymerization vessel was charged with 200 parts of water, 0.06 part of lauryl peroxide and 0.08 part of a dispersing agent, and after replacing the atmosphere in the vessel with nitrogen, 100 parts by vinyl chloride was fed thereinto. The content was maintained at 65° C. under suitable agitation and polymerized for 15 hours to produce suspension polymerized PVC having a polymerization degree of 800 and the grain size distribution as follows.

| Grain diameter (µ): | Percent by weight |
|---|---|
| Above 300 | 0.1 |
| 300–250 | 2.8 |
| 250–180 | 46.9 |
| 180–150 | 20.6 |
| 150–100 | 22.4 |
| 100–60 | 6.7 |
| Below 60 | 0.5 |

REFERENCE 6

This is a typical manner of PVC polymerization by the emulsion process as conventionally performed on industrial scales.

A polymerization vessel was charged with 200 parts of water, 0.08 part of potassium persulfate and 0.055 part of sodium salt of higher fatty acid, and after replacing the atmosphere in the vessel with nitrogen, 100 parts of vinyl chloride was added thereto. The content was maintained at 62° C. under suitable agitation and polymerized for 14 hours. Thus obtained emulsion was added with aqueous calcium chloride to salt out the polymer. Whereupon PVC powder having a polymerization degree of 800 and the following grain size distribution was obtained.

| Grain diameter (µ): | Percent by weight |
|---|---|
| Above 300 | 0.1 |
| 300–250 | 0.2 |
| 250–180 | 1.8 |
| 180–150 | 1.8 |
| 150–100 | 2.3 |
| 100–60 | 6.9 |
| 60–40 | 19.9 |
| Below 40 | 67.1 |

REFERENCE 7

This is an example of a special polymerization in which the particle diameters of the spherical primary particles were controlled in the emulsion polymerization procedure.

A polymerization vessel was charged with 200 parts of water, 0.08 part of potassium persulfate, 0.85 part of calcium salt of a higher fatty acid and 5 parts of the polymeric emulsion obtained in Reference 6. After replacing the atmosphere in the vessel with nitrogen, 100 parts of vinyl chloride was added thereto, and the content of the vessel was maintained at 62° C. under suitable agitation. After initiation of the polymerization, further

TABLE 3

| Grain diameter (µ) | Above 990 | 990–880 | 880–700 | 700–500 | 500–300 | 300–250 | 250–180 | 180–150 | 150–100 | 100–60 | 60–40 | Below 40 |
|---|---|---|---|---|---|---|---|---|---|---|---|---|
| Ref. 1, wt. percent | | | | | 0 | 14.1 | 39.9 | 13.4 | 17.5 | 11.4 | 3.7 | 0 |
| Ref. 2, wt. percent | 3.5 | 3.4 | 11.0 | 23.2 | 39.8 | 7.8 | 5.9 | 5.4 | 0 | | | |
| Ref. 3, wt. percent | | | | | | 0 | 0.9 | 5.1 | 36.2 | 37.7 | 20.1 | |
| Ref. 4, wt. percent | | | | | 0 | 1.2 | 1.4 | 1.5 | 3.1 | 7.3 | 13.0 | 7.25 |

The PVC of Reference 4 was subjected to a stronger grinding so that its content of grains having diameters no less than 40µ was made about 27% by weight, much below 70% by weight.

REFERENCE 5

This is a typical manner of PVC polymerization by the suspension process as conventionally performed on industrial scales.

total 15 parts of the polymeric emulsion obtained in Reference 6 was added to the system at 2 hours' intervals as three equally divided portions. In the meantime the polymerization was continued, and after total 14 hours' polymerization, the resultant polymer was salted out by addition of aqueous calcium chloride to the polymeric emulsion obtained. Thus PVC powder having a polymerization degree of 800 and the following grain size distribution was obtained.

Grain diameter (μ): | Percent by weight
--- | ---
Above 300 | 0.1
300–250 | 0.1
250–180 | 2.0
180–150 | 2.1
150–100 | 3.1
100–60 | 18.7
60–40 | 24.4
Below 40 | 49.5

The observation of the PVC grains from the suspension polymerization process of Reference 5 with electron microscope revealed that its particle form was amorphous, porous macro-grains. On the other hand, similar observation of the PVC grains from the emulsion polymerization process of Reference 6 with electron microscope showed that the same consisted of agglomerates of fine spherical primary particles having a uniform diameter of about 0.1μ. Also according to the similar observation of the PVC grains from the special emulsion polymerization process of Reference 7 with electron microscope, the same consisted of agglomerates of four groups of spherical particles mixed together, each group having a uniform diameter of, respectively, about 0.4μ, 0.7μ, 1.1μ and 1.8μ.

The following examples and controls were all performed employing the same glass lining reaction vessel of 200 liter capacity and the constant agitation of 200 r.p.m.

EXAMPLE 1

The glass lining vessel was charged with 150 parts of the PVC powder of Reference 1 and 850 parts of water, and into which nitrogen gas was blown, while the content was thoroughly agitated, to replace the air in the reaction system. The content was then heated and maintained at 75° C., and into which chlorine gas containing oxygen was introduced to initiate the reaction. The rate of chlorine gas supply was controlled to such that the maximum reaction rate should be obtained and the greatest part of the chlorine gas supplied should be consumed.

The chlorine gas employed was the industrial chlorine having an oxygen content of 0.4 vol. percent obtained by electrolysis of saline water, of which oxygen content being reduced to 0.008 vol. percent by distillation refining before the use.

The mixing-in of oxygen was performed by mixing the chlorine gas with the calculated amount of air in a mixing tank, preceding the gas supply to the reaction vessel.

When the chlorine content of the reaction product reached 67%, the chlorine gas supply was stopped, and the product was filtered, washed with water to be removed of the chlorine and hydrochloric acid adhering thereonto and dried. Thus white Cl-PVC powder was obtained.

In this example, the oxygen regulations, viz., oxygen content of the chlorine gas and the oxygen supply rate were each controlled as in Table 4 below in each run to produce the respective samples.

TABLE 4

| Sample | Oxygen content of chlorine gas (vol. percent) | Average oxygen supply rate (l./hr./kg.-PVC) |
| --- | --- | --- |
| A | 0.19 | 0.036 |
| B | 0.14 | 0.023 |
| C | 0.23 | 0.038 |
| D | 0.30 | 0.042 |
| E | 0.12 | 0.018 |

Control 1

Repeating the reaction of Example 1 except varying the oxygen regulations, viz., oxygen content of the chlorine gas and oxygen supply rate, as indicated in Table 5 below, white Cl-PVC powders were obtained by water-washing and drying of the chlorination products.

TABLE 5

| Sample | Oxygen content of chlorine gas (vol. percent) | Average oxygen supply rate (l./hr./kg.-PVC) |
| --- | --- | --- |
| A | 0.20 | 0.156 |
| B | 0.03 | 0.030 |
| C | 0.37 | 0.039 |
| D | 1.10 | 0.372 |
| E | 0.30 | 0.351 |
| F | 0.18 | 0.007 |

The test results of the samples obtained in Example 1 and Control 1 measured in accordance with the afore-described testing methods are given in Table 6. However, the blending was in accordance with what was described in item 2 of the aforesaid process for measuring by a plastograph.

TABLE 6

| Sample | Example | | | | | Control | | | | | |
| --- | --- | --- | --- | --- | --- | --- | --- | --- | --- | --- | --- |
| | 1-A | 1-B | 1-C | 1-D | 1-E | 1-A | 1-B | 1-C | 1-D | 1-E | 1-F |
| Oxygen regulations in the chlorination reaction: | | | | | | | | | | | |
| (a) Oxygen supply rate (l./hr./kg.-PVC) | 0.036 | 0.023 | 0.038 | 0.042 | 0.018 | 0.156 | 0.030 | 0.050 | 0.372 | 0.351 | 0.007 |
| (b) Oxygen concentration in chlorine gas (vol. percent) | 0.190 | 0.140 | 0.230 | 0.300 | 0.120 | 0.200 | 0.030 | 0.370 | 1.100 | 0.300 | 0.180 |
| Cl-content of Cl-PVC (wt. percent) | 67.1 | 67.1 | 66.9 | 67.1 | 66.9 | 67.0 | 67.2 | 67.1 | 67.0 | 67.1 | 66.0 |
| Chlorination time required for attaining about 67% Cl-content (hr.) | 12 | 18 | 8 | 7 | 20 | 8 | 100 | 7 | 5 | 6 | 80 |
| Presence of P point by plastograph measurement | No | No | No | No | No | Yes | (¹) | Yes | Yes | Yes | Yes |
| Heat stabilities: | | | | | | | | | | | |
| Blackening time of Cl-PVC (min.) | 85 | 95 | 73 | 60 | 75 | 50 | 55 | 46 | 30 | 40 | 51 |
| Blackening time for moulded sample sheet (min.) | 215 | 220 | 195 | 175 | 205 | 150 | 160 | 130 | 80 | 110 | 155 |
| Initial coloration of press-shaped plate: | | | | | | | | | | | |
| Reflectivity of blue filter transmission ray (percent) | 28.8 | 33.5 | 27.0 | 24.5 | 27.0 | 21.4 | 22.7 | 17.1 | 9.6 | 10.8 | 16.6 |
| Congo red test of moulded sample sheet (min.) | 40 | 43 | 30 | 25 | 37 | 20 | 23 | 20 | 9 | 18 | 21 |
| Flow properties: | | | | | | | | | | | |
| Flow temperature (° C.) | 148 | 146 | 151 | 152 | 150 | 169 | 164 | 170 | 186 | 181 | 171 |
| Flow rate (×10⁻³ cm.³/sec.) | 25 | 28 | 23 | 23 | 24 | 16 | 19 | 17 | 11 | 14 | 18 |
| Impact strength ² (kg.-cm./cm.²) | 7.8 | 7.9 | 7.0 | 6.4 | 7.1 | 4.3 | 5.0 | 4.8 | 2.2 | 3.0 | 4.5 |
| Softening temperature ² (° C.) | 117 | 118 | 117 | 117 | 116 | 116 | 110 | 117 | 116 | 115 | 116 |

¹ No gelation.
² Both the measured values as to the plate formed by pressing as described in the explanation of testing methods.

From Table 6 it can be understood that when even one of either condition (a) or (b) on the oxygen regulations in the chlorination reaction in the aqueous suspension is not met, the resultant Cl-PVC's have much inferior heat stabilities, flow properties and impact strength.

Again it can be understood that, in Example 1, the Cl-PVC obtained with such oxygen regulation (a), viz., oxygen supply rate, of 0.02–0.04 liter/hr./kg.-PVC and such oxygen regulation (b), viz., oxygen concentration in chlorine gas, of 0.1–0.2 vol. percent has the particularly preferred properties.

Furthermore, none of the samples obtained in Example 1 had P point by plastograph measurement. In contrast thereto, samples of Control 1 possessed P point.

EXAMPLE 2

The glass lining vessel was charged with 150 parts of the PVC powder of Reference 2 and 850 parts of water, and the reaction was performed in exactly the same manner as described in Example 1, under the oxygen regulations same to those for Sample A of Example 1, viz., oxygen content in the chlorine gas of 0.19 vol. percent and oxygen supply rate of 0.036 liter/hr./kg.-PVC. The resultant product was filtered, water-washed and dried to yield white Cl-PVC powder.

EXAMPLE 3

Repeating the reaction of Example 2 except that the PVC powder of Reference 3 was used, white Cl-PVC powder was obtained upon filtering, water-washing and drying the reaction product.

Control 2

Repeating the reaction of Example 2 except that the PVC powder from the emulsion polymerization of Reference 6 was used, white Cl-PVC powder was obtained upon filtering, water-washing and drying the reaction product.

Control 3

Repeating the reaction of Example 2 except that the PVC powder from the suspension polymerization of Reference 5 was used, white Cl-PVC powder was obtained upon filtering, water-washing and drying the reaction product.

Control 4

Repeating the reaction of Example 2 except that the PVC powder of Reference 4 was used, white Cl-PVC powder was obtained upon filtering, water-washing and drying the reaction product.

Control 5

Repeating the reaction of Example 2 except that the PVC of Reference 7 was used, white Cl-PVC powder was obtained upon filtering, water-washing and drying the reaction product.

The Cl-PVC's obtained in Examples 2 and 3, and Controls 2, 3, 4 and 5 were tested in accordance with the afore-described testing methods, the results being shown in Table 7. However, the blending was in accordance with what the described in item 2 of the aforesaid process for measuring by a plastograph.

ly the reaction rate thereof is insufficient and the qualities of the resultant Cl-PVC, inferior. Again the case of employing PVC having spherical primary particles of 0.4–1.8μ in diameter obtained by the special emulsion polymerization produced likewise unsatisfactory result.

EXAMPLE 4

Repeating the reaction of Example 2 except using the PVC powder of Reference 1 and making the reaction temperature 60° C., white Cl-PVC powder was obtained upon filtering, water-washing and drying the reaction product.

EXAMPLE 5

The glass lining vessel was charged with 150 parts of the PVC powder of Reference 1 and 850 parts of water, and the air in the reaction system was replaced by nitrogen. The temperature was maintained by 60° C. while the content was violently agitated. In the meantime, chlorine gas containing 0.18 vol. percent of oxygen was introduced into the system at such a rate as would make the presence of chlorine in the exhaust gas hardly appreciable and the reaction rate, maximum, to start the reaction. The temperature was raised to 75° C. 2 hours and 30 minutes after the reaction started, and the reaction was continued until the chlorine content of the reaction product reached 67%. The average oxygen supply rate in that case was 0.039 liter/hr./kg.-PVC. Filtering, water-washing and drying the product, white Cl-PVC powder was obtained.

EXAMPLE 6

The glass lining vessel was charged with 150 parts of the PVC powder of Reference 1 and 850 parts of water, and the air in the reaction system was replaced by nitrogen. The content was maintained at the temperature of 60° C. while being violently agitated, and into which chlorine gas containing 0.17 vol. percent of oxygen was introduced at such a rate that the presence of chlorine in the exhaust gas should become hardly ap-

TABLE 7

| Sample | Example | | | Control | | | |
|---|---|---|---|---|---|---|---|
| | 1-A | 2 | 3 | 2 | 3 | 4 | 5 |
| Oxygen regulations in the chlorination reaction: | | | | | | | |
| (a) Oxygen supply rate (l./hr./kg.-PVC) | 0.036 | 0.036 | 0.036 | 0.036 | 0.036 | 0.036 | 0.036 |
| (b) Oxygen concentration in chlorine gas (vol. percent) | 0.190 | 0.190 | 0.190 | 0.190 | 0.190 | 0.190 | 0.190 |
| Cl-content of Cl-PVC (wt. percent) | 67.1 | 67.0 | 67.1 | 67.0 | 67.2 | 67.0 | 66.9 |
| Chlorination time required for attaining about 67% Cl-content (hr.) | 12 | 11 | 10 | 52 | 29 | 20 | 28 |
| Presence of P point by plastograph measurement | No | No | No | Yes | Yes | Yes | (¹) |
| Heat stabilities: | | | | | | | |
| Blackening time of Cl-PVC (min.) | 85 | 70 | 83 | 20 | 40 | 25 | 30 |
| Blackening time for moulded sample sheet (min.) | 215 | 200 | 180 | 60 | 120 | 130 | 165 |
| Congo red test of moulded sample sheet (min.) | 40 | 40 | 33 | 11 | 16 | 20 | 25 |
| Initial coloration of press-shaped plate: Reflectivity of blue filter transmission ray (percent) | 28.8 | 27.7 | 28.0 | 10.2 | 21.9 | 23.0 | 20.4 |
| Flow properties: | | | | | | | |
| Flow temperature (° C.) | 148 | 150 | 152 | 178 | 180 | 178 | 167 |
| Flow rate (×10⁻³ cm.³/sec.) | 25 | 23 | 24 | 12 | 13 | 15 | 18 |
| Impact strength ² (kg.-cm./cm.²) | 7.8 | 7.4 | 6.1 | 4.6 | 5.5 | 3.6 | 3.5 |
| Softening temperature ² (° C.) | 117 | 116 | 116 | 108 | 115 | 116 | 114 |

¹ No gelation.
² Both the measured values as to the plate formed by pressing as described in the explanation of testing methods.

From Table 7, it can be understood that the Cl-PVC's obtained by chlorination of the PVC's having the granular form and diameters as specified in the requirements (I) have sufficiently high rate of reaction without exception, and have excellent heat stabilities and flow properties as well as great impact strength.

In contrast thereto, when PVC's from conventional emulsion or suspension polymerization processes are made the starting material, not only the chlorination reaction rate is low but also the properties of the resultant Cl-PVC's are far inferior. Furthermore it can be understood that even though the starting PVC is that prepared by the specified polymerization process in the requirements (I) and is composed of agglomerates of spherical primary particles of 0.1–5μ in diameters, still if its content of such agglomerates of which diameters are no less than 40μ is below 70% by weight, similarpreciable and the maximum reaction rate should be obtained. Three hours after the reaction started, the reaction temperature was raised to 80° C. and the reaction was continued under the introduction of chlorine gas containing no significant amount of oxygen, the oxygen content being at highest 0.008 vol. percent. At the point when the chlorine content of the product reached 67% the reaction was stopped, and the product was filtered, washed with water and dried to yield white Cl-PVC powder.

In that case, for the initial 3 hours of the reaction the average supply rate of oxygen was 0.39 liter/hr./kg.-PVC, and thereafter it was 0.0002 liter/hr./kg.-PVC.

Control 6

The glass lining vessel was charged with 150 parts of the PVC powder of Reference 1, 850 parts of water, and 85 parts of chloroform as a swelling agent, and the air in the reaction system was replaced by nitrogen. While maintaining the temperature of 55° C., the content was violently stirred and into which chlorine was introduced under the same oxygen regulations as of Example 2. However after the chlorine content of the product reached 62%, for the subsequent 20 hours no progress in the reaction was observed. As the reaction thus substantially reached the stage of termination, the experiment was discarded and a similar experiment was repeated under the same conditions as above.

In the second time run, at the point when the chlorine content of the product reached 64% considerable decrease in the reaction rate was observed, but the reaction was continued until the chlorine content reached 67%, regardless the great time consumption. Thus obtained product was filtered, washed first with water and then with methanol to be removed of the swelling agent, and dried to yield white Cl-PVC powder.

The Cl-PVC's obtained in Examples 4, 5, 6 and Control 6 were tested in accordance with the afore-described testing methods, the results being shown in Table 8. However, the blending was in accordance with what was described in item 2 of the aforesaid process for measuring by a plastograph.

TABLE 8

| Sample | Example 4 | Example 5 | Example 6 | Control |
|---|---|---|---|---|
| Oxygen regulations in the chlorination reaction: | | | | |
| (a) Oxygen supply rate (l./hr./kg.-PVC) | 0.036 | 0.040 | [1] 0.0391 / [2] 0.00021 | 0.036 |
| (b) Oxygen concentration in chlorine gas (vol. percent) | 0.190 | 0.180 | [1] 0.17 / [2] <0.008 | 0.190 |
| Cl-content of Cl-PVC (wt. percent) | 67.0 | 66.9 | 67.1 | 66.9 |
| Chlorination time required for attaining about 67% Cl-content (hr.) | 11 | 10 | 17 | 120 |
| Presence of P point by plastograph measurement | No. | No. | No. | Yes |
| Heat stabilities: | | | | |
| Blackening time of Cl-PVC (min.) | 88 | 93 | 102 | 35 |
| Blackening time for moulded sample sheet (min.) | 210 | 225 | 270 | 100 |
| Congo red test of moulded sample sheet (min.) | 42 | 45 | 45 | 19 |
| Initial coloration of press-shaped plate: Reflectivity of blue filter transmission ray (percent) | 29.2 | 34.0 | 39.0 | 19.0 |
| Flow properties: | | | | |
| Flow temperature (° C.) | 150 | 148 | 147 | 180 |
| Flow rate ($\times 10^{-3}$ cm.$^3$/sec.) | 26 | 29 | 31 | 10 |
| Impact strength [3] (kg-cm./cm.$^2$) | 7.0 | 7.8 | 8.0 | 5.1 |
| Softening temperature [3] (° C.) | 118 | 117 | 117 | 116 |

[1] Earlier stage.
[2] Later stage.
[3] Both the measured values as to the plate formed by pressing as described in the explanation of testing methods.

From Table 8 it can be understood that with the lowered reaction temperature of 60° C. still satisfactory reaction rate can be obtained, the resultant Cl-PVC furthermore having better heat stabilities and flow properties. This result is further confirmed by the case wherein the reaction temperature of 55° C.-below secondary transition point of PVC was employed in the earlier stage and that of 70–80° C. which is higher than that of the earlier stage is employed in the later stage. And, still better result is achievable by supplying chlorine gas containing no substantially significant amount of oxygen in the latter stage of the two-stage reaction as described in the above.

On the other hand, it can also be understood that the use of swelling agents in the aqueous suspension chlorination system in the presence of oxygen is not only meaning less, but such serves only to lower the reaction rate and causes the loss in reproducibility of the reaction, furthermore producing Cl-PVC of very much inferior qualities.

Hereinafter the results of actually shaping the Cl-PVC's of the foregoing examples and controls with the indicated shaping machines and comparing their working properties will be given.

EXAMPLE 7

Samples obtained from Example 1–A and Controls 1–E, 2 and 3 were each formed into pellet (about 3 mm. x 4 mm.) of the following formulation, and further moulded into pipes (wall thickness 3.0±0.3 mm.) of nominal size 16 inch as specified in JIS–K6741 (1960) by means of the extruding machine specified below.

Formulation (parts by weight):
| | |
|---|---|
| Cl-PVC | 100 |
| Tribasic lead sulfate | 3.5 |
| Dibasic lead stearate | 1.0 |
| Polyethylene (molecular weight 1,500–2,000) | 1.0 |
| Cadmium-barium complex stabilizer | 1.0 |
| Organic tin stabilizer | 1.0 |
| Ethylene/vinyl acetate copolymer | 5.0 |

Extruding machine:
1½″ extruding machine screw—
| | |
|---|---|
| Compression ratio | 3.8 |
| L/D | 2.0 |

Extruding conditions:
| | |
|---|---|
| Barrel temp., ° C | 180 |
| Die temp., ° C | 180 |
| Screw rotation rate, r./m. | 20 |

The moulding was repeated 3 times as to each sample, the results being shown in Table 9.

TABLE 9.—PROPERTIES OF MOULDED ARTICLE

| Cl-PVC | Operability of injection moulding | Appearance Outer surface | Appearance Inner surface | Coloration [1] (percent) | Dynstat impact strength [2] (kg.m./cm.$^2$) | Tensile strength [2] (kg./cm.$^2$) | Flattening test [2] (kg.) | Softening temp.[2] (° C.) |
|---|---|---|---|---|---|---|---|---|
| Example 1-A: | | | | | | | | |
| No. 1 | Very easy | Smooth and lustrous | Smooth and lustrous | 22.9 | 7.1 | 600 | 365 | 116 |
| No. 2 | do | do | do | 24.0 | 7.0 | 605 | 380 | 115 |
| No. 3 | do | do | do | 21.6 | 7.3 | 590 | 360 | 116 |
| No. 4 | Difficult | Coarse and not lustrous | Very coarse, not lustrous | 8.1 | 4.0 | 530 | 204 | 101 |
| Control 2: | | | | | | | | |
| No. 5 | Very difficult | Very coarse, not lustrous | Very coarse, exfoliated pieces adhering in places, not lustrous | 7.5 | 3.5 | 535 | 194 | 100 |
| No. 6 | Difficult | Coarse, not lustrous | Very coarse, not lustrous | 7.9 | 3.7 | 537 | 200 | 101 |
| Control 3: | | | | | | | | |
| No. 7 | Easy | Smooth in less degree, not lustrous | Coarse, not lustrous | 14.8 | 4.7 | 525 | 210 | 112 |
| No. 8 | do | do | Smooth in less degree, not lustrous | 17.1 | 4.8 | 540 | 240 | 111 |
| No. 9 | do | Smooth but not lustrous | do | 18.1 | 5.0 | 534 | 230 | 110 |
| Control 1-E: | | | | | | | | |
| No. 10 | Difficult | Coarse, not lustrous | Very coarse, not lustrous | 6.0 | 1.5 | 210 | 144 | 95 |
| No. 11 | Very difficult | Very coarse, not lustrous | Very coarse and foaming, not lustrous | ([3]) | ([3]) | | 34 | ([3]) |
| No. 12 | do | do | Very coarse, forming and bulging, not lustrous | Not measurable as decomposition took place and the article was severely deformed | | | | |

[1] The pipes were made into test pieces by pressing under the conditions of 170° C. x 10 min. x 35 kg./cm.$^2$, initial coloration test.
[2] Measured in accordance with the afore-described quality testing methods for Cl-PVC.
[3] Not measurable.

As is apparent from Table 9, in the practical working properties the Cl-PVC's prepared under the conditions failing to satisfy even one of the requirements (I) and (II) of the invention are far inferior, in contrast to the products of the invention excellently adapted to working. The moulded products from the Cl-PVC of the invention also have good properties. This difference in working properties was still more conspicuous when the aforesaid sample Cl-PVC's were made into pellet of the following formulation and further injection moulded into ¾" elbow under the moulding conditions specified below.

Formulation: Parts by weight
- Cl-PVC _____ 100
- Tribasic lead sulfate _____ 3.5
- Dibasic lead stearate _____ 1.5
- Polyethylene _____ 1.0
- Cadmium-barium complex stabilizer _____ 1.0
- Organic tin stabilizer _____ 2.0
- Butyl stearate _____ 1.5
- Ethylene/vinyl acetate copolymer _____ 5.0

Injection moulding machine, product of Meiki Seisakujo, Japan, In-line single screw type:
Screw—
  Diameter, 36 mm.
  L/D 22
  Compression ratio 1.6
  Injection capacity, oz. 4.50
  Compression pressure of mould, kg./cm.² 7500

Injection Moulding Conditions

| Sample | Example 1-A | Control 2 | Control 3 | Control 1-E |
|---|---|---|---|---|
| Barrel Temp. (° C.) | | | | |
| Zone I | 180 | 180 | 185 | 180 |
| Zone II | 180 | 180 | 185 | 180 |
| Zone III | 200 | 185 | 190 | 185 |
| Injection pressure (kg./cm.²) | 1,550 | 1,400 | 1,400 | 1,400 |
| Injection speed (cm.³/sec.) | 50 | 30 | 30 | 30 |

The results of the injection moulding are given in Table 10 below.

TABLE 10

| Cl-PVC | Maximum operable injection moulding pressure kg./cm.²) | Maximum operable injection speed (cc./sec.) | Moulded Article Outer surface | Inner surface | Coloration¹ (percent) | Dynstat impact strength² (kg.m./cm.²) | Softening temp.² (° C.) |
|---|---|---|---|---|---|---|---|
| Example 1-A | 1,550 | 50 | Smooth and lusterous | | 17.8 | 8 | 107 |
| Control 2 | Moulding inoperable | | | | | | |
| Control 3 | 1,400 | 30 | Coarse and not lusterous | | 4.1 | 4 | 102 |
| Control 1-E | Moulding inoperable | | | | | | |

¹ The elbows were made into test pieces by pressing under the conditions of 170° C. x 10 min. x 35 kg./cm.², which were subjected to the afore-described initial coloration test.
² Measured in accordance with the afore-described quality testing methods for Cl-PVC.

In case of injection moulding, from the standpoints of physical properties of the resultant moulded product and the rate of moulding, the greater the injection pressure and speed, the better.

However greater injection pressure and speed are feasible only for resins of good working characteristics and consequently the maximum operable values of the said conditions well serve as the norm for grading the working characteristics of the resins.

As is apparent from Table 10, in the practical injection moulding requiring still higher flow properties, working properties and heat stabilities, Cl-PVC's prepared under the conditions not satisfying even one of the requirements (I) and (II) of the invention are hardly mouldable or, if moulded, produce the articles of very inferior qualities, due to their poor properties as named in the above. In contrast thereto, Cl-PVC's of the subject invention are very satisfying for injection moulding and furthermore the qualities of the moulded products are excellent. On the other hand, with the Cl-PVC's prepared under the conditions satisfying the requirements (I) but failing to meet the oxygen regulations specified in the requirements (II), again the injection moulding is hardly operable.

We claim:
1. A process for the preparation of chlorinated polyvinyl chloride charatcerized by the use of (I) PVC powder obtained from polymerization process performed in the absence of emulsifiers but in an aqueous medium which does not substantially dissolve vinyl chloride monomer nor appreciably swells or deforms the polymer formed, in the presence of a polymerization catalyst which is insoluble in the monomer but is soluble in the medium, said PVC powder being composed of agglomerates of spherical primary particles of 0.1–5 microns in diameter and at least 70% by weight thereof having diameters no less than 40 microns, which comprises the steps of (II) suspending the said PVC powder in water or hydrochloric acid, feeding chlorine and oxygen into the suspension under such conditions that the rate of oxygen supply is less than 0.05 liter/hr./kg.-PVC but not less than 0.01 liter/hr./kg.-PVC, and that the oxygen concentration in the chlorine gas is 0.05–0.35% by volume, and whereby contacting the chlorine with the said PVC powder in the suspension, in the absence of swelling agents, at temperatures ranging 550–80° C.

2. The process in accordance with claim 1 in which the oxygen supply rate is 0.02–0.04 liter/hr./kg.-PVC and the oxygen concentration is 0.1–0.3 vol. percent.

3. The process in accordance with claim 1 in which the PVC powder is that obtained by grinding such PVC powder composed of agglomerates of primary particles of 0.1–5 microns in diameter, said agglomerates having diameters above 3 mm., for the purpose of grain size control.

4. The process in accordance with claim 1 in which the reaction temperature of the chlorination is maintained during the initial reaction period at the range of 55° C. to secondary transition temperature of polyvinyl chloride, and thereafter the reaction under heating is continued at a temperature within the range of 65°–80° C. and which is higher than that employed for the initial reaction period.

5. The process in accordance with claim 4 in which the PVC is chlorinated during the said initial reaction period to such a degree that the resultant Cl-PVC has a chlorine content of about 62%.

References Cited
UNITED STATES PATENTS 3,287,336  11/1966  Taylor.

JOSEPH L. SCHOFER, Primary Examiner

J. A. DONAHUE, Jr., Assistant Examiner

S-162     UNITED STATES PATENT OFFICE
CERTIFICATE OF CORRECTION

Patent No. 3,506,637        Dated April 14, 1970

Inventor(s) Tetuya Makino et al

It is certified that error appears in the above-identified patent and that said Letters Patent are hereby corrected as shown below:

Claim 1, line 28, delete "550" and substitute --55°--.

Signed and sealed this 28th day of September 1971.

(SEAL)
Attest:

EDWARD M. FLETCHER, JR.        ROBERT GOTTSCHALK
Attesting Officer               Acting Commissioner of Patents